United States Patent
Rivoir et al.

(10) Patent No.: US 10,489,611 B2
(45) Date of Patent: Nov. 26, 2019

(54) LOW OVERHEAD RANDOM PRE-CHARGE COUNTERMEASURE FOR SIDE-CHANNEL ATTACKS

(71) Applicant: Cryptography Research, Inc, San Francisco, CA (US)

(72) Inventors: Roberto Rivoir, Aix-en-Provence (FR); Elke De Mulder, Bellevue, WA (US); Jean-Michel Cioranesco, Paris (FR)

(73) Assignee: Rambus Inc., Sunnyvale, CA (US)

( * ) Notice: Subject to any disclaimer, the term of this patent is extended or adjusted under 35 U.S.C. 154(b) by 375 days.

(21) Appl. No.: 15/245,507

(22) Filed: Aug. 24, 2016

(65) Prior Publication Data
US 2017/0061121 A1 Mar. 2, 2017

Related U.S. Application Data

(60) Provisional application No. 62/210,215, filed on Aug. 26, 2015.

(51) Int. Cl.
*G06F 21/75* (2013.01)

(52) U.S. Cl.
CPC ...... *G06F 21/755* (2017.08); *G06F 2221/034* (2013.01)

(58) Field of Classification Search
CPC .................. G06F 21/755; G06F 2221/034
See application file for complete search history.

(56) References Cited

U.S. PATENT DOCUMENTS

| | | | |
|---|---|---|---|
| 5,491,663 A | 2/1996 | Teel | |
| 6,327,661 B1 * | 12/2001 | Kocher | G06F 21/602 380/28 |
| 6,633,992 B1 | 10/2003 | Rosen | |
| 7,587,044 B2 * | 9/2009 | Kocher | G06F 7/00 380/1 |
| 7,599,488 B2 * | 10/2009 | Kocher | G06F 7/00 380/1 |
| 8,212,585 B1 | 7/2012 | Price | |
| 9,081,990 B2 * | 7/2015 | Elbaum | G11C 7/08 |

(Continued)

OTHER PUBLICATIONS

Bucci, Marco et al., "A Power Consumption Randomization Countermeasure for DPA-Resistant Cryptographic Processors", PATMOS 2004, Sep. 15-17, 2004, Lecture Notes in Computer Science, vol. 3254, pp. 481-490. 10 pages.

(Continued)

*Primary Examiner* — Michael R Vaughan
(74) *Attorney, Agent, or Firm* — The Neudeck Law Firm, LLC

(57) ABSTRACT

A side-channel attack resistant circuit topology for performing logic functions. This topology includes combinatorial logic to perform the at least one logic function. A logic input selector alternately supplies, in response to a first timing reference signal, an input to the combinatorial logic with noise generating input values and valid input values. A first latch input selector alternately supplies, in response to the first timing reference signal, a first memory element input with noise generating input values and valid logic output values. The valid logic output values are received from the combinatorial logic. A first memory element latches the valid logic output values in response to a second timing reference signal.

20 Claims, 11 Drawing Sheets

(56) References Cited

U.S. PATENT DOCUMENTS

| | | | |
|---|---|---|---|
| 9,536,581 B2* | 1/2017 | Katoh | G11C 13/0059 |
| 9,755,822 B2* | 9/2017 | Han | H04L 9/003 |
| 2005/0002523 A1* | 1/2005 | Sonnekalb | H04L 9/003 |
| | | | 380/28 |
| 2005/0108498 A1* | 5/2005 | Kaminaga | G06F 12/1408 |
| | | | 711/209 |
| 2008/0143561 A1* | 6/2008 | Miyato | H03M 5/04 |
| | | | 341/79 |
| 2008/0189555 A1* | 8/2008 | Sohn | G06F 21/77 |
| | | | 713/192 |
| 2011/0156756 A1 | 6/2011 | Bancel et al. | |
| 2011/0260749 A1 | 10/2011 | Deas et al. | |
| 2011/0285421 A1 | 11/2011 | Deas et al. | |
| 2012/0250435 A1* | 10/2012 | Matsunaga | G11C 7/12 |
| | | | 365/194 |
| 2013/0129083 A1* | 5/2013 | Fujino | G11C 7/24 |
| | | | 380/29 |
| 2014/0143883 A1* | 5/2014 | Shen-Orr | H04L 9/003 |
| | | | 726/26 |
| 2016/0315760 A1* | 10/2016 | Gori | H04L 9/003 |

OTHER PUBLICATIONS

Yuan, Jiren et al., "High-speed CMOS circuit technique", IEEE Journal of Solid-State Circuits, vol. 24, No. 1, pp. 62-70. Feb. 1989. 9 pages.

\* cited by examiner

LOW OVERHEAD RANDOM PRE-CHARGE COUNTERMEASURE FOR SIDE-CHANNEL ATTACKS

DETAILED DESCRIPTION OF THE EMBODIMENTS

In an embodiment, a circuit topology comprises combinatorial logic supplying the inputs of latches/registers. The outputs of the latches/registers can be provided to subsequent combinatorial logic and/or registers. The input(s) to the combinatorial logic circuits are alternately provided with random data and valid data. The output(s) from the combinatorial logic circuit that result from the valid data are latched. The output(s) from the combinatorial logic circuit that result from the random data inputs are ignored. Likewise, the input(s) to register (or latch, flip-slop, memory element, etc.) stages are alternately provided with random data and valid data. The valid data is latched. The random data is ignored.

Although the random inputs to the combinatorial logic and the latch stages are ignored, these random inputs cause random power dissipation and electromagnetic noise to be generated as the circuits switch in response to the random data inputs. This randomized power dissipation noise helps provide resistance to side-channel analysis techniques—such as simple power analysis (SPA) and differential power analysis (DPA). This additional randomized noise helps provides resistance to power analysis and related attacks by making it difficult for an attacker to correlate the side-channel information collected with a circuit's inputs, outputs, and/or stored values.

Figure 1:
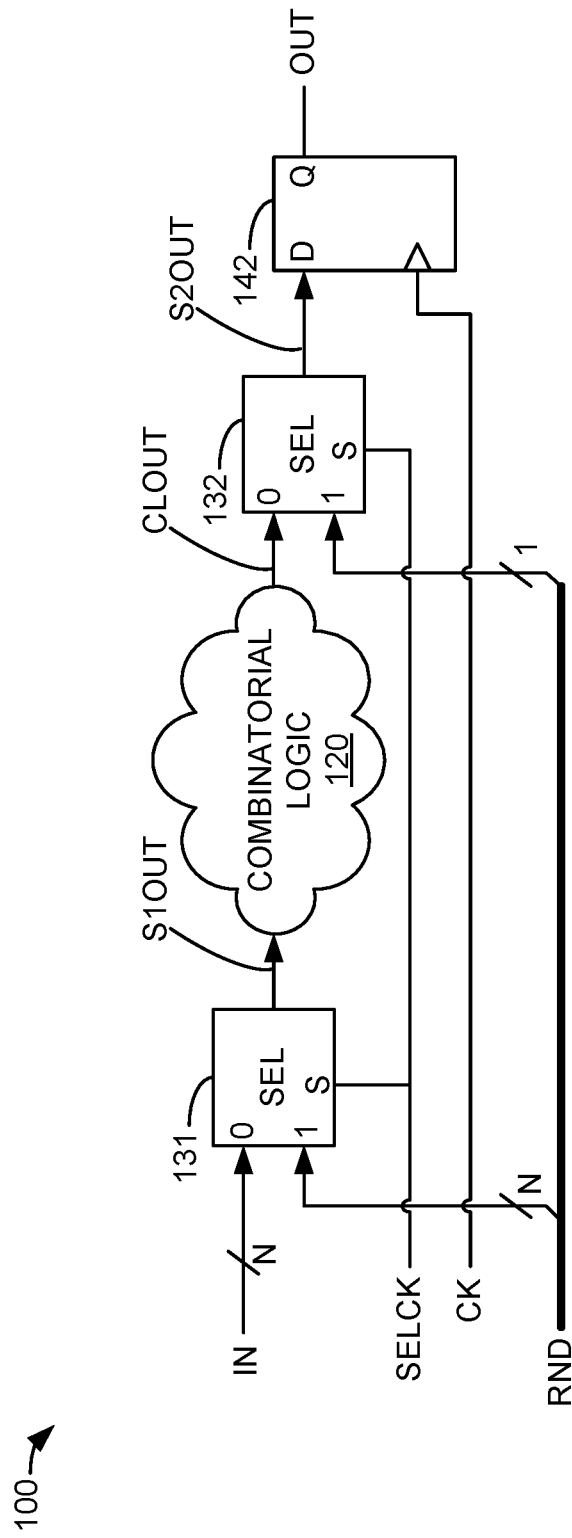
FIG. 1 is a block diagram of a side-channel attack countermeasure.

FIG. 1 is a block diagram of a side-channel attack countermeasure. In FIG. 1, countermeasure circuit 100 comprises combinatorial logic 120, selector 131, selector 132, and latch 142. Selector 131 receives N number of valid inputs (IN) at a first set of data inputs, and N number of random (i.e., invalid or noise generating) inputs (RND) at a second set of data inputs. N is an integer greater than or equal to one. The random RND values may be provided by one or more random number generating or pseudo-random number generating circuit(s). The control input (S) of selector 131 receives the signal SELCK. The state of SELCK determines which input to selector 131 is provided at the output (S1OUT) of selector 131. For example, if SELCK has a logic value of zero (0), selector 131 provides the IN input values to the output(s) S1OUT of selector 131. If SELCK has a logic value of one (1), selector 131 provides the invalid RND input values to the output(s) S1OUT of selector 131. Selector 131 may be, for example, a 2N to N (e.g., 8:4) multiplexer (a.k.a., MUX).

The output(s) S1OUT of selector 131 are input to combinatorial logic 120. Combinatorial logic 120 operates on the values provided on S1OUT to perform a logic function. For example, combinatorial logic 120 may perform one or more logical functions such as NOT, AND, NAND, OR, NOR, XOR, and/or XNOR. These, and/or other circuit implemented logic functions may be combined to perform complex logical functions on single and/or multiple bit binary values such as addition, multiplication, etc. The results output by combinatorial logic 120 are provided at the output(s) CLOUT of combinatorial logic 120. The output of CLOUT may be multiple bits (e.g., P number of bits). However, for the sake of brevity, this discussion will be based on a single bit that is output by combinatorial logic 120.

The output of combinatorial logic 120 is input to a first data input of selector 132. A second data input of selector 132 receives a random (i.e., invalid or noise generating) input (e.g., one bit of RND) at a second data input. The control input (S) of selector 132 receives the signal SELCK. The state of SELCK determines which input to selector 132 is provided at the output (S2OUT) of selector 132. For example, if SELCK has a logic value of zero (0), selector 131 provides the output of combinatorial logic 120 CLOUT to the output S2OUT of selector 132. If SELCK has a logic value of one (1), selector 132 provides the invalid RND bit value to the output S2OUT of selector 132. Selector 132 may be, for example, a 2 to 1 (a.k.a., 2:1) multiplexer.

The output of selector 132, S2OUT, is operatively coupled to the data input (D) of latch 142. The output (Q) of latch 142 is the signal OUT. Latch 142 is clocked to store/hold the value of S2OUT and place that value on OUT by a timing reference signal CK. The operation of countermeasure circuit 100 will be further described with reference to the timing diagram illustrated in FIG. 2.

Figure 2:
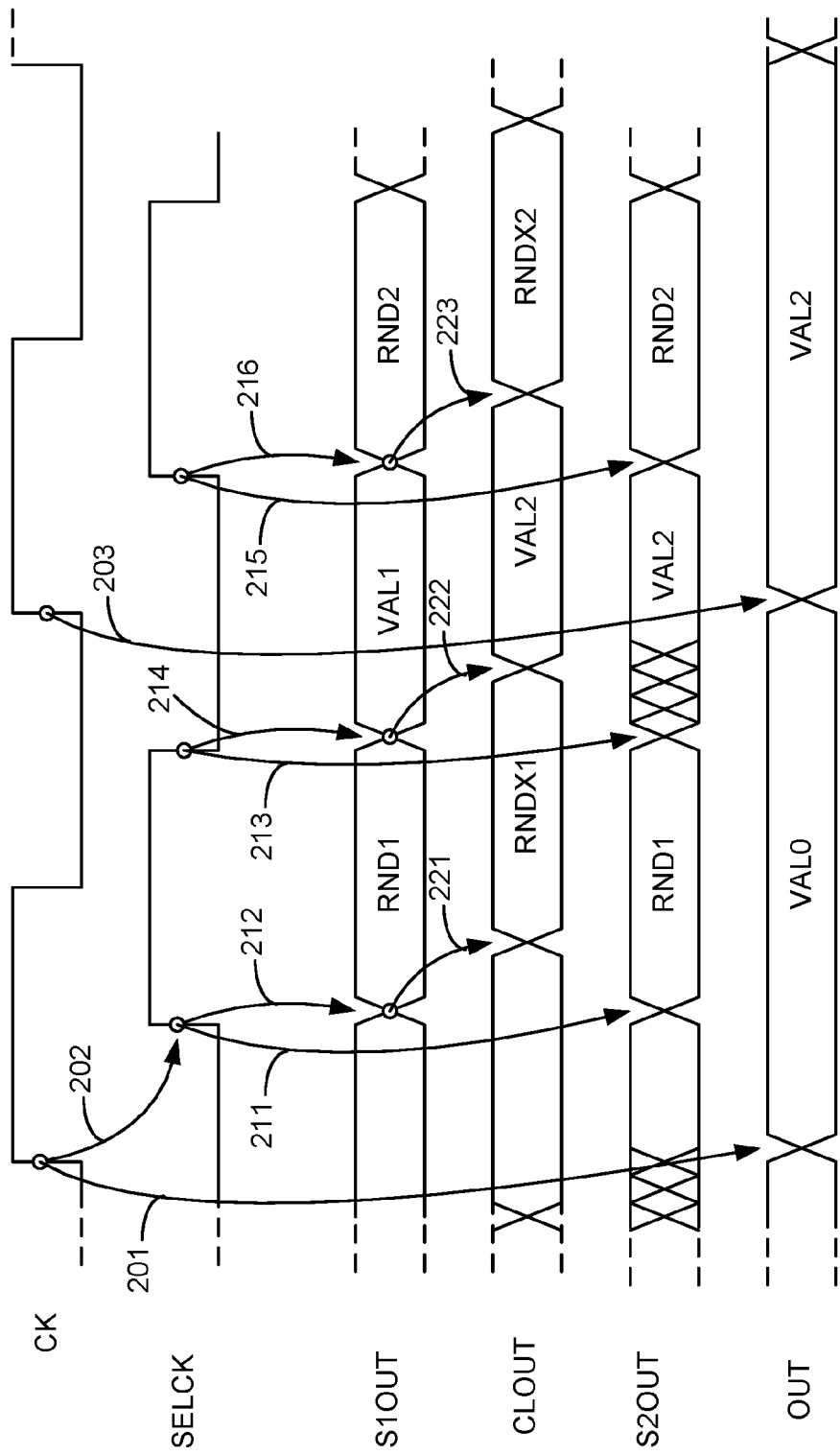
FIG. 2 is a timing diagram illustrating the operation of a side-channel attack countermeasure.

FIG. 2 is a timing diagram illustrating the operation of a side-channel attack countermeasure. In FIG. 2, a first timing reference (CK), a second timing reference (SELCK), an input to combinatorial logic 120 (S1OUT), an output from combinatorial logic 120 (CLOUT), an output from selector 132 (S2OUT), and the output of latch 142 (OUT) are illustrated. For the duration of the timing diagram of FIG. 2, CK and SELCK are shown toggling with the same period. However, SELCK is delayed (a.k.a., phase shifted) by approximately ¼ of a cycle (a.k.a., 90° phase shift/delay). This delay between CK and SELCK is illustrated by arrow 202 from the first rising edge of CK to the first rising edge of SELCK.

The rising edges of CK trigger latch 142 to hold the value at the D input of latch 142 and switch (if necessary) the output of the Q output (OUT) of latch 142. In response to this rising edge transition, OUT is illustrated having the value VAL0. This is illustrated by arrow 201 from the first rising edge of CK to the first transition of OUT. After a period of time (e.g., ¼ of a cycle), while CK is in a high state, SELCK transitions to high state.

The transitions from a low state to a high state of SELCK cause selector 131 and selector 132 to provide the values from the inputs selected by the high state of SELCK to their respective outputs. In the case of selector 131, the high state of SELCK causes selector 131 to provide the invalid RND input values to the output S1OUT of selector 131. This is illustrated by arrow 212 from the first rising edge of SELCK to the first transition of S1OUT. After this first transition, S1OUT is illustrated as having the value RND1. In the case of selector 132, the high state of SELCK causes selector 132 to provide an invalid RND input value to the output S2OUT of selector 132. This is illustrated by arrow 211 from the first rising edge of SELCK to the first transition of S2OUT. After this first transition, S2OUT is illustrated as having the value RND1.

After SELCK transitions, the new value RND1 on S1OUT propagates through combinatorial logic 120 to cause a new value (RNDX1) to be produced on CLOUT. The transition of CLOUT to the value RNDX1, as caused by the transition of S1OUT to RND1, is illustrated by arrow 221 from the transition of S1OUT to the transition of CLOUT.

While SELCK is high, CK transitions to a low value. After a period of time (e.g., ¼ of a cycle), while CK is in a low state, SELCK transitions from a high state to a low state.

The transition from a high state to a low state of SELCK cause selector 131 and selector 132 to provide the values from the inputs selected by the low state of SELCK to their respective outputs. In the case of selector 131, the low state of SELCK causes selector 131 to provide the valid IN input values to the output S1OUT of selector 131. This is illustrated by arrow 214 from the falling edge of SELCK to the second transition of S1OUT. After this second transition, S1OUT is illustrated as having the value VAL1. In the case of selector 132, the low state of SELCK causes selector 132 to provide the value on CLOUT to the output S2OUT of selector 132. This is illustrated by arrow 213 from the first falling edge of SELCK to the second transition of S2OUT. After this first transition (and some propagation delay through combinatorial logic 120), S2OUT is illustrated as having the value VAL2.

The new valid value VAL1 on S1OUT propagates through combinatorial logic 120 to cause a new value (VAL2) to be produced on CLOUT. The transition of CLOUT to the value VAL2, as caused by the transition of S1OUT to VAL1, is illustrated by arrow 222 from the transition of S1OUT to the transition of CLOUT to the valid value VAL2. After a period of time (e.g., ¼ of a cycle), while SELCK is in a low state, SELCK transitions from a low state to a high state.

This rising edge transition of CK triggers latch 142 to hold the value at the D input of latch 142 and switch (if necessary) the output of the Q output (OUT) of latch 142. In response to this rising edge transition, OUT is illustrated having the value VAL2. This is illustrated by arrow 203 from the second rising edge of CK to the second transition of OUT. After a period of time (e.g., ¼ of a cycle), while CK is in a high state, SELCK transitions to high state.

As discussed herein, the transitions from a low state to a high state of SELCK cause selector 131 and selector 132 to provide the values from the inputs selected by the high state of SELCK to their respective outputs. In the case of selector 131, the second period where SELCK is in a high state causes selector 131 to provide new invalid RND input values to the output S1OUT of selector 131. This is illustrated by arrow 216 from the second rising edge of SELCK to the second transition of S1OUT. After this first transition, S1OUT is illustrated as having the value RND2. In the case of selector 132, the second period where SELCK is in a high state causes selector 132 to provide a new invalid RND input value to the output S2OUT of selector 132. This is illustrated by arrow 215 from the second rising edge of SELCK to the second transition of S2OUT. After this first transition, S2OUT is illustrated as having the value RND2.

The new value RND2 on S1OUT propagates through combinatorial logic 120 to cause a new value (RNDX2) to be produced on CLOUT. The transition of CLOUT to the value RNDX2, as caused by the transition of S1OUT to RND2, is illustrated by arrow 223 from the transition of S1OUT away from VAL1 to the transition of CLOUT to RNDX2. While SELCK is high, CK transitions to a low value. After a period of time (e.g., ¼ of a cycle), while CK is in a low state, SELCK transitions from a high state to a low state.

Figure 3:
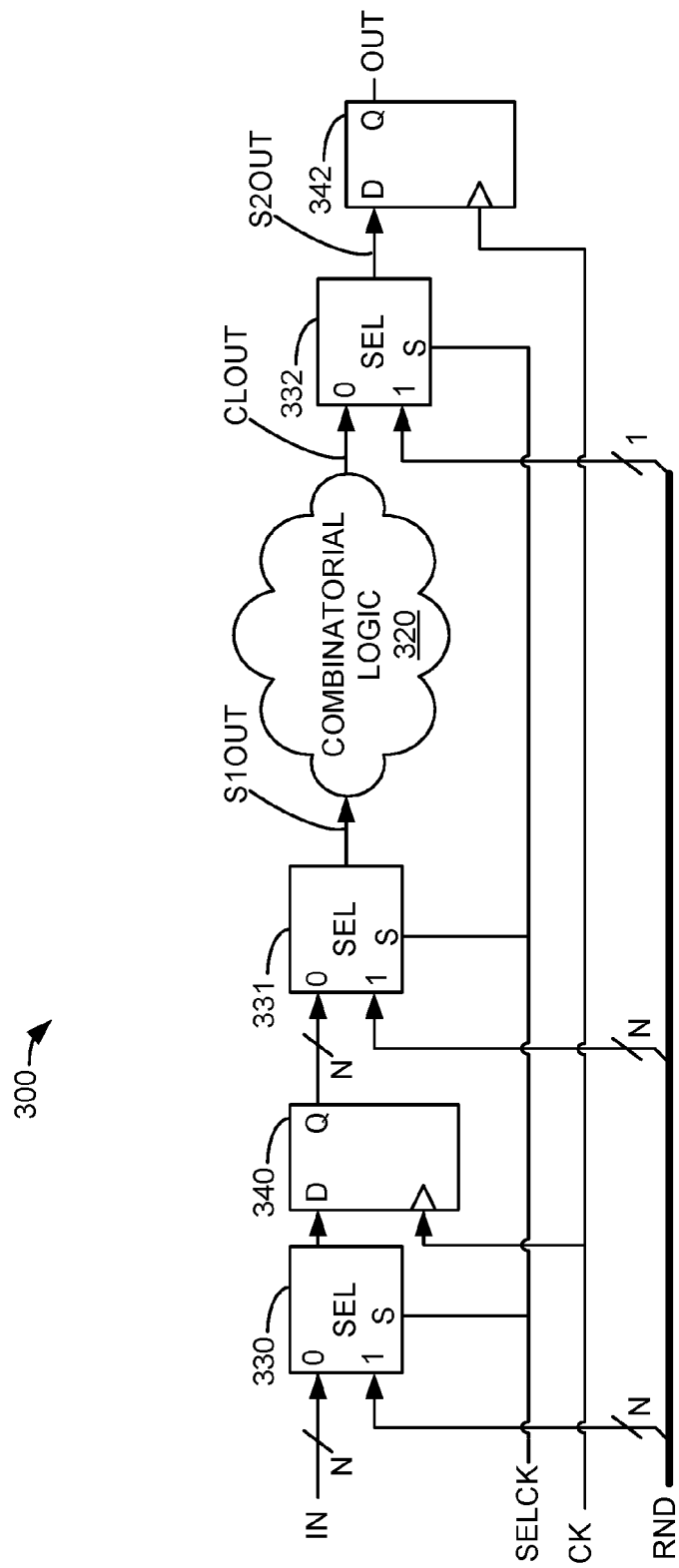
FIG. 3 is a block diagram of a countermeasure.

FIG. 3 is a block diagram of a countermeasure. In FIG. 3, countermeasure circuit 300 comprises selector 330, latch 340, selector 331, combinatorial logic 320, selector 332, and latch 342. Selector 330 receives N number of valid inputs (IN) at a first set of data inputs, and N number of random (i.e., invalid or noise generating) inputs (RND) at a second set of data inputs. N is an integer greater than or equal to one. The control input (S) of selector 330 receives the signal SELCK. The state of SELCK determines which input to selector 330 is provided at the output of selector 330 to the one or more inputs of latch 340. For example, if SELCK has a logic value of zero (0), selector 330 provides the IN input values to the inputs of latch 340. If SELCK has a logic value of one (1), selector 330 provides the invalid RND input values to the inputs of latch 340. It should be understood that latch 340 is an N-bit latch. That is, latch 340 may comprise multiple single bit latches in order to latch N number of bits. Selector 330 may be, for example, a 2N to N (e.g., 8:4) multiplexer (a.k.a., MUX).

The N number of outputs of latch 340 are input to selector 331. Selector 331 receives N number of valid inputs from latch 340 at a first set of data inputs, and N number of random (i.e., invalid or noise generating) inputs (RND) at a second set of data inputs. N is an integer greater than or equal to one. The control input (S) of selector 331 receives the signal SELCK. The state of SELCK determines which input to selector 331 is provided at the output (S1OUT) of selector 331. For example, if SELCK has a logic value of zero (0), selector 331 provides the IN input values to the output(s) S1OUT of selector 331. If SELCK has a logic value of one (1), selector 331 provides the invalid RND input values to the output(s) S1OUT of selector 331. Selector 331 may be, for example, a 2N to N (e.g., 8:4) multiplexer (a.k.a., MUX).

The output(s) S1OUT of selector 331 are input to combinatorial logic 320. Combinatorial logic 320 operates on the values provided on S1OUT to perform a logic function. For example, combinatorial logic 320 may perform one or more logical functions such as NOT, AND, NAND, OR, NOR, XOR, and/or XNOR. These, and/or other circuit implemented logic functions may be combined to perform complex logical functions on single and/or multiple bit binary values such as addition, multiplication, etc. The results output by combinatorial logic 320 are provided at the output(s) CLOUT of combinatorial logic 320. The output of CLOUT may be multiple bits (e.g., P number of bits). However, for the sake of brevity, this discussion will be based on a single bit that is output by combinatorial logic 320.

The output of combinatorial logic 320 is input to a first data input of selector 332. A second data input of selector 332 receives a random (i.e., invalid or noise generating) input (e.g., one bit of RND) at a second data input. The control input (S) of selector 332 receives the signal SELCK.

The state of SELCK determines which input to selector 332 is provided at the output (S2OUT) of selector 332. For example, if SELCK has a logic value of zero (0), selector 331 provides the output of combinatorial logic 320 CLOUT to the output S2OUT of selector 332. If SELCK has a logic value of one (1), selector 332 provides the invalid RND bit value to the output S2OUT of selector 332. Selector 332 may be, for example, a 2 to 1 (a.k.a., 2:1) multiplexer.

The output of selector 332 S2OUT is operatively coupled to the data input (D) of latch 342. The output (Q) of latch 342 is the signal OUT. Latch 342 is clocked to store/hold the value of S2OUT and place that value on OUT by a timing reference signal CK. As described herein, in operation, CK and SELCK can toggle at the same frequency, but with one signal delayed with respect to the other. In an embodiment, SELCK is delayed by approximately ¼ of a cycle when compared to CK.

Figure 4:
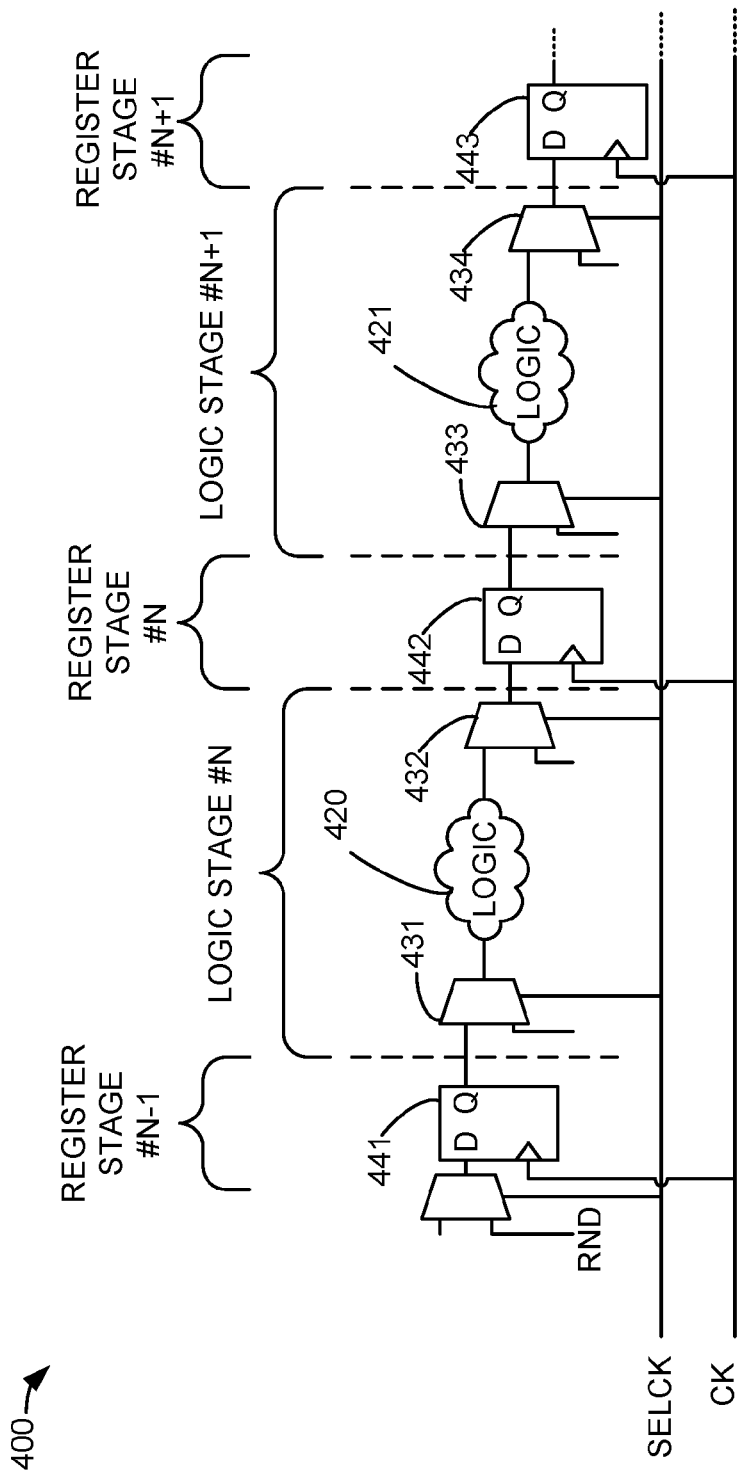
FIG. 4 is a block diagram of a countermeasure circuit topology.

FIG. 4 is a block diagram of a countermeasure circuit topology. In FIG. 4, register stage #N−1 provides values to the inputs of logic stage #N; logic stage #N provides values to the inputs of register stage #N; register stage #N provides values to the inputs of logic stage #N+1; and, logic stage #N+1 provides values to the inputs of register stage N+1. Additional logic stages and register stages may be connected to logic stages and/or register stages, but are omitted herein for the sake of brevity.

In FIG. 4, register stage #N−1 comprises latch 441. Logic stage #N comprises MUX 431, logic 420, and MUX 432. Register stage #N comprises latch 442. Logic stage #N+1 comprises MUX 433, logic 421, and MUX 434. Register stage #N+1 comprises latch 443.

The output of latch 441 provides outputs from register stage #N−1. The clock input of latch 441 is coupled to CK. When the appropriate transition of CK occurs (e.g., low-to-high), the value on latch 441's D input is transferred to the output of latch 441 and held at that value until another transition occurs to transfer new data from the D input of latch 441 to the output of latch 441. One or more outputs of register stage #N−1 are provided to the inputs of logic stage #N. In particular, one or more outputs from latch 441 are provided as valid data inputs to a first input of MUX 431 of logic stage #N. MUX 431 also receives invalid data at another input (not shown in FIG. 4.) SELCK is coupled to the control input of MUX 431 to select whether MUX 431 provides logic 420 with valid data received from register stage #N−1 or provides logic 420 with invalid (e.g., random or pseudo-random) data.

In logic stage #N, the outputs of MUX 431 are coupled to logic 420. At least one output of logic 420 is coupled to a first input of MUX 432. MUX 432 also receives invalid data at another input (not shown in FIG. 4.) SELCK is coupled to the control input of MUX 432 to select whether MUX 432 provides register stage #N with data received from logic 420, or provides register stage #N with invalid (e.g., random or pseudo-random) data. The output of MUX 432 is provided to an input of register stage #N, and the input of latch 442, in particular.

The input of latch 442 is received from logic stage #N, and the output of MUX 432, in particular. The output of latch 442 provides outputs from register stage #N. When the appropriate transition of CK occurs (e.g., low-to-high), the value on latch 442's D input is transferred to the output of latch 442 and held at that value until another transition occurs to transfer new data from the D input of latch 442 to the output of latch 442. One or more outputs of register stage #N are provided to the inputs of logic stage #N+1. In particular, one or more outputs from latch 442 are provided as valid data inputs to a first input of MUX 433 of logic stage #N+1. MUX 433 also receives invalid data at another input (not shown in FIG. 4.) SELCK is coupled to the control input of MUX 433 to select whether MUX 433 provides logic 421 with valid data received from register stage #N or provides logic 421 with invalid (e.g., random or pseudo-random) data.

In logic stage #N+1, the outputs of MUX 433 are coupled to logic 421. At least one output of logic 421 is coupled to a first input of MUX 434. MUX 434 also receives invalid data at another input (not shown in FIG. 4.) SELCK is coupled to the control input of MUX 434 to select whether MUX 434 provides register stage #N+1 with data received from logic 421, or provides register stage #N+1 with invalid (e.g., random or pseudo-random) data. The output of MUX 434 is provided to an input of register stage #N+1, and the input of latch 443, in particular.

The input of latch 443 is received from logic stage #N+1, and the output of MUX 434, in particular. The output of latch 443 provides outputs from register stage #N+1. When the appropriate transition of CK occurs (e.g., low-to-high), the value on latch 443's D input is transferred to the output of latch 443 and held at that value until another transition occurs to transfer new data from the D input of latch 443 to the output of latch 443.

Figure 5:
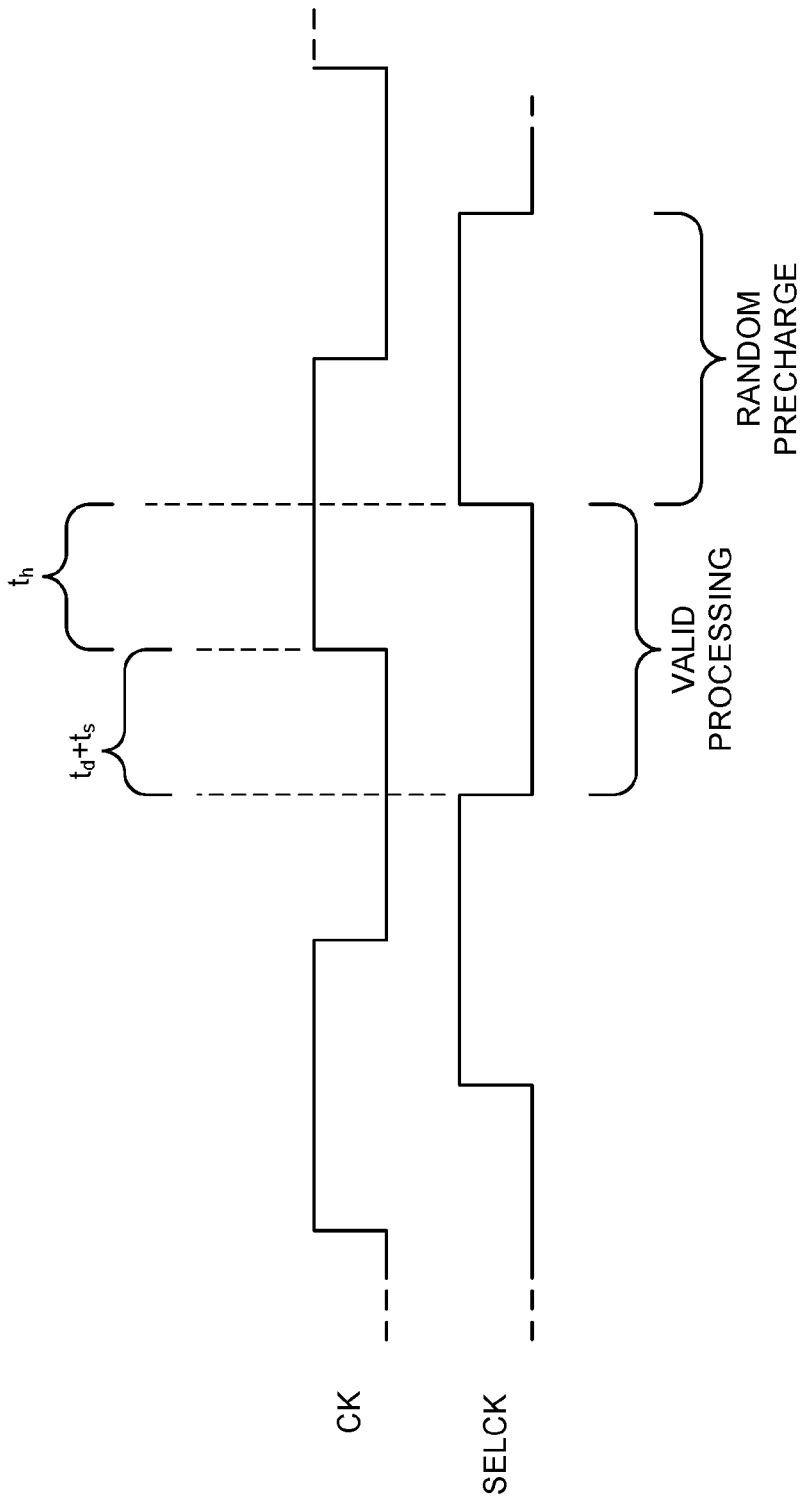
FIG. 5 is a timing diagram illustrating the operation of timing references for a countermeasure circuit topology.

FIG. 5 is a timing diagram illustrating the operation of timing references for a countermeasure circuit topology. In FIG. 5, a first timing reference (CK) and a second timing reference (SELCK) are illustrated. For the duration of the timing diagram of FIG. 5, CK and SELCK are shown toggling with the same period. However, SELCK is delayed (a.k.a., phase shifted) by approximately ¼ of a cycle (a.k.a., 90° phase shift/delay). The delay between CK and SELCK results in an amount of time from the falling edge of SELCK to the rising edge of CK that is illustrated as equal to $t_d+t_s$. The delay between CK and SELCK also results in an amount of time from the rising edge of CK to the rising edge of SELCK that is illustrated as equal to $t_h$. The time $t_s$ represents the propagation delay through a logic stage (e.g., logic stage #N, logic 120, and/or logic 320) from SELCK falling (which marks the start of the processing of valid data). The time $t_s$ represents the setup time required by a latch (e.g., register stage #N, latch 142, and/or latch 342) for the input to the latch to be stable before CK rises to reliably catch and store the value on the latch's input. The time $t_h$ represents the hold time required by a latch (e.g., register stage #N, latch 142, and/or latch 342) for the input to be stable after CK rises to reliably catch and store the value on the latch's input. Thus, as illustrated in FIG. 5, the timing relationship between CK and SELCK determines the amount of time, $t_d$, each logic stage (e.g., logic stage #N, logic 120, and/or logic 320) has to operate on inputs to produce an output for the corresponding register stage.

Figure 6:
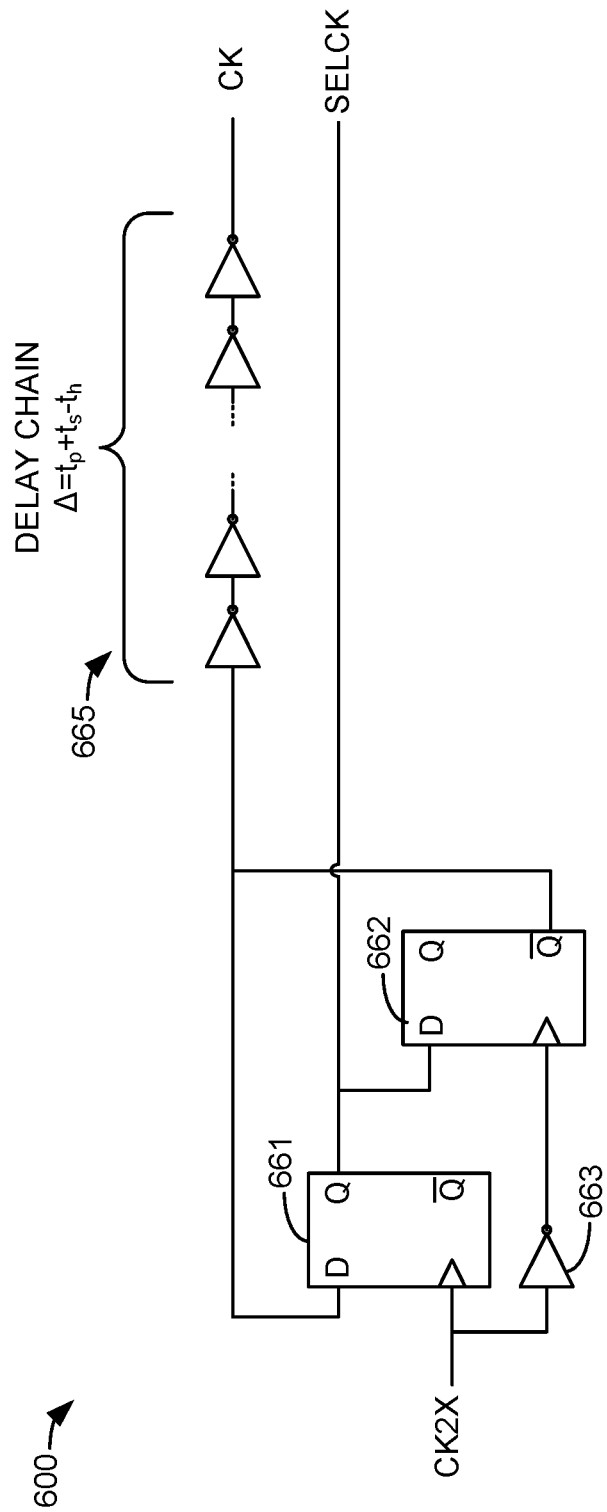
FIG. 6 is a block diagram illustrating a timing reference generator.

FIG. 6 is a block diagram illustrating a timing reference generator. Timing reference generator 600 comprises flip-flop (a.k.a., latch, D type latch, etc.) 661, flip-flop 662, inverter 663, and delay chain 665. In FIG. 6, flip-flops 661 and 662 are illustrated as D type flip-flops. However, it should be understood that other types of flip-flop circuits may be employed.

An input timing reference, CK2×, is provided to the clock input of flip-flop 661. CK2× is also provided to the input of inverter 663. The output of inverter 663 is provided to the clock input of flip-flop 662. The non-inverting output of flip-flop 661 provides the signal SELCK. SELCK is also input to the data input of flip-flop 662. The inverting output of flip-flop 662 is provided to the data input of flip-flop 661.

The inverting output of flip-flop 662 is also provided to the input of delay chain 665. The output of delay chain 665 provides the signal CK. In an embodiment, delay chain 665 delays the output of flip-flop 661 by an amount of time, Δ. In an embodiment, Δ is selected such that $\Delta <= t_p + t_s - t_h$.

In an embodiment, CK2× toggles at a rate that is twice (e.g., 2×) the rate that CK and SELCK toggle at. Thus, each rising edge of CK2× causes a change in the state of SELCK. Each falling edge of CK2× causes a change in state of CK. In this manner, SELCK and CK toggle at the same rate, but are approximately ¼ cycle apart in time. In addition, because of the propagation delay of delay chain 665, the rising edge of CK is less than ¼ cycle before the rising edge of SELCK. Thus, the delay Δ helps delay the CK timing reference signal to allow more time for a logic stage (e.g., logic stage #N, logic 120, and/or logic 320) to operate on its inputs and still have its output(s) reliably captured by the next register stage. The additional delay Δ provided by delay chain 665 tracks with the process, supply voltage, and temperature of logic stages and register stages. This helps dynamically compensate for differences between propagation of the CK timing reference path and the SELCK timing reference.

Figure 7:
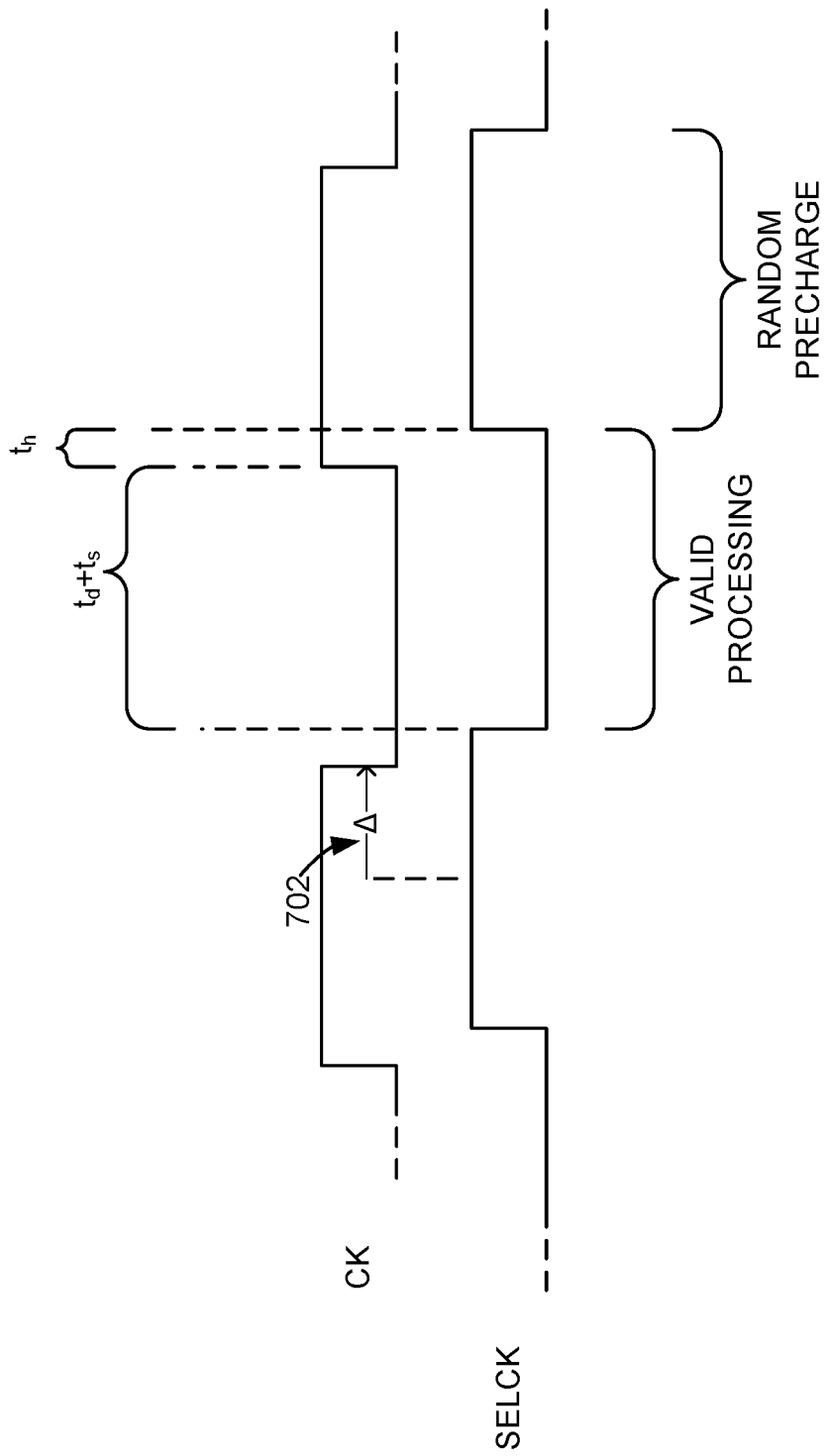
FIG. 7 is a timing diagram illustrating the operation of a compensated timing reference for a countermeasure circuit topology.

FIG. 7 is a timing diagram illustrating the operation of a compensated timing reference for a countermeasure circuit topology. In FIG. 7, a first timing reference (CK) and a second timing reference (SELCK) are illustrated. For the duration of the timing diagram of FIG. 7, CK and SELCK are shown toggling with the same period. The delay between CK and SELCK results in an amount of time from the falling edge of SELCK to the rising edge of CK that is illustrated as equal to $t_d + t_s$. The delay between CK and SELCK also results in an amount of time from the rising edge of CK to the rising edge of SELCK that is illustrated as equal to $t_h$. An additional delay, Δ, from the timing midpoint between transitions on SELCK that is added to CK is also illustrated by arrow 702. This additional delay (e.g., provided by delay chain 665) reduces the amount of time provided for $t_h$, but increases the amount of time provided for $t_d + t_s$. Thus, the additional delay, Δ, can increase the amount of time a logic stage (e.g., logic stage #N, logic 120, and/or logic 320) has to operate on its inputs and still have those outputs reliably captured by the next register stage(s).

Figure 8:
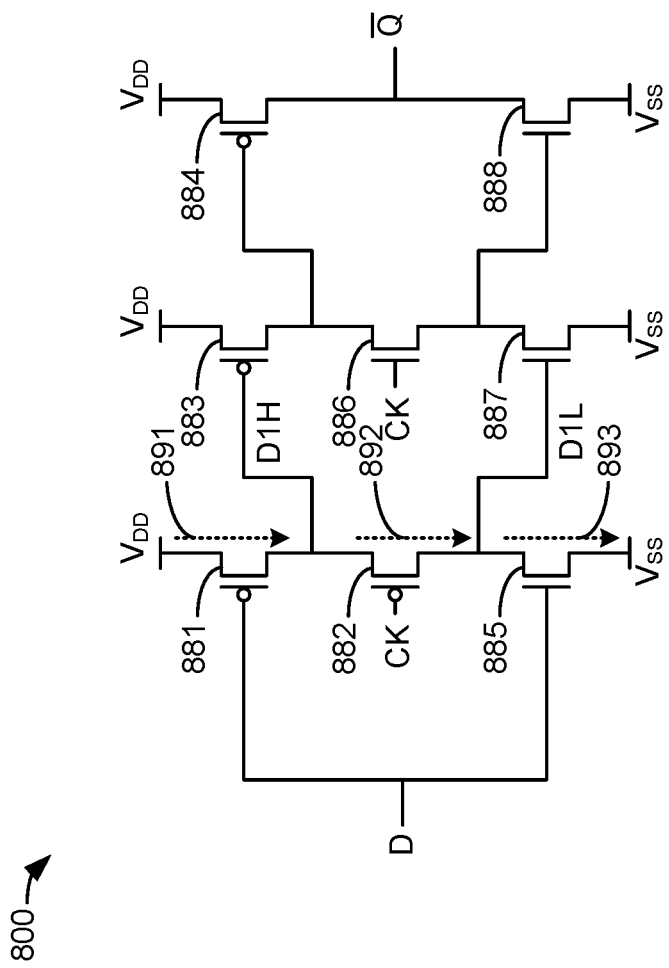
FIG. 8 is an illustration of switching currents that contribute to power dissipation and electromagnetic noise inside a dynamic memory element.

FIG. 8 is an illustration of switching currents that contribute to power dissipation and electromagnetic noise inside a dynamic memory element. In FIG. 8, a latch 800 comprises p-channel field-effect transistor (PFET) 881, PFET 882, PFET 883, PFET 884, n-channel field effect transistor (NFET) 885, NFET 886, NFET 887, and NFET 888. The source of PFET 881 is connected to the positive supply voltage, $V_{DD}$. The gate of PFET is connected to the data input, D, of latch 800. The drain of PFET 881 and the source of PFET 882 are connected to node D1H. The gate of PFET 882 is connected to the timing reference signal CK that clocks latch 800. The drain of PFET 882 and the drain of NFET 885 are connected to node D1L. The gate of NFET 885 is connected to the data input, D, of latch 800. The source of NFET 885 is connected to the negative supply voltage, $V_{SS}$.

The source of PFET 883 is connected to $V_{DD}$. The gate of PFET 883 is connected to node D1H. The drain of PFET 883 is connected to the gate of PFET 884 and the source of NFET 886. The gate of NFET 886 is connected to the timing reference signal CK. The source of NFET 886 is connected to the gate of NFET 888 and the drain of NFET 887. The source of NFET 887 is connected $V_{SS}$. The source of PFET 884 is connected to VDD. The drain of PFET 884 and the drain of NFET 888 are connected to the output of latch 800.

Latch 800 may be used, for example, in a register stage (i.e., as one or more of latches 441-443), as latch 142, latch 340, and/or latch 342. Because the input to the latches in countermeasures 100, 300, and 400 are alternated between valid data (e.g., data from combinatorial logic) and invalid, random data depending on the state of SELCK, the internal transistors of latch 800 can be switched on and off by the random data. This switching causes noise to be generated on the power supply nodes $V_{DD}$ and $V_{SS}$. These current flows that help generate this noise are summarized in Table 1 with reference to FIG. 8.

TABLE 1

| Current state of output | Transition | Current arrow shown in FIG. 2 |
|---|---|---|
| 1 | D transitions from 1 to 0 | Arrow 891 |
| 1 | CK transitions from 1 to 0 | Arrow 892 |
| 0 | D transitions from 0 to 1 | Arrow 893 |
| 0 | CK transitions from 1 to 0 | Arrow 892 |

Figure 9:
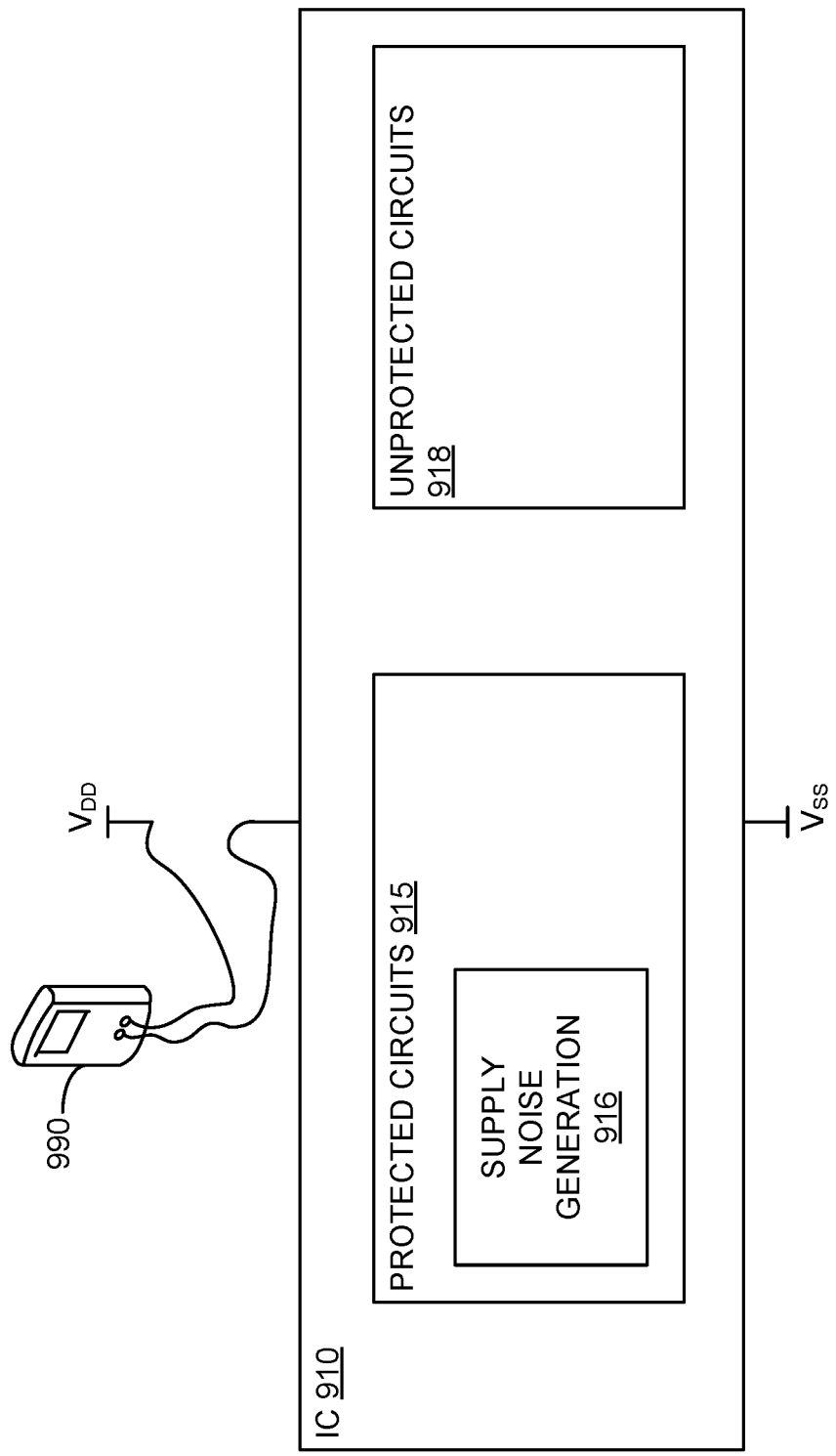
FIG. 9 is an illustration of a side-channel attack configuration.

FIG. 9 is an illustration of a side-channel attack configuration. Integrated circuit 910 includes protected circuits 915 and unprotected circuits 918. Protected circuits 915 include supply noise generation circuits 916. Supply noise generation circuits 916 can include, for example, countermeasure circuit 100, countermeasure circuit 300, and/or countermeasure topology 400. In FIG. 9, supply current measuring device 990 is used to take samples, over time, of the current flowing into (or out of) an integrated circuit 910. Using these samples, simple power analysis or differential power analysis may be used to attempt to discern the operation and/or values input, output, and/or stored by protected circuits 915. In an embodiment, supply noise generation circuits 916 are constructed and operated as described herein to generate additional noise on the power supplies as measured by device 990. This additional noise helps obscure the operation and/or values used by protected circuits 915 thereby making protected circuits 915 more immune to power analysis attack.

Figure 10:
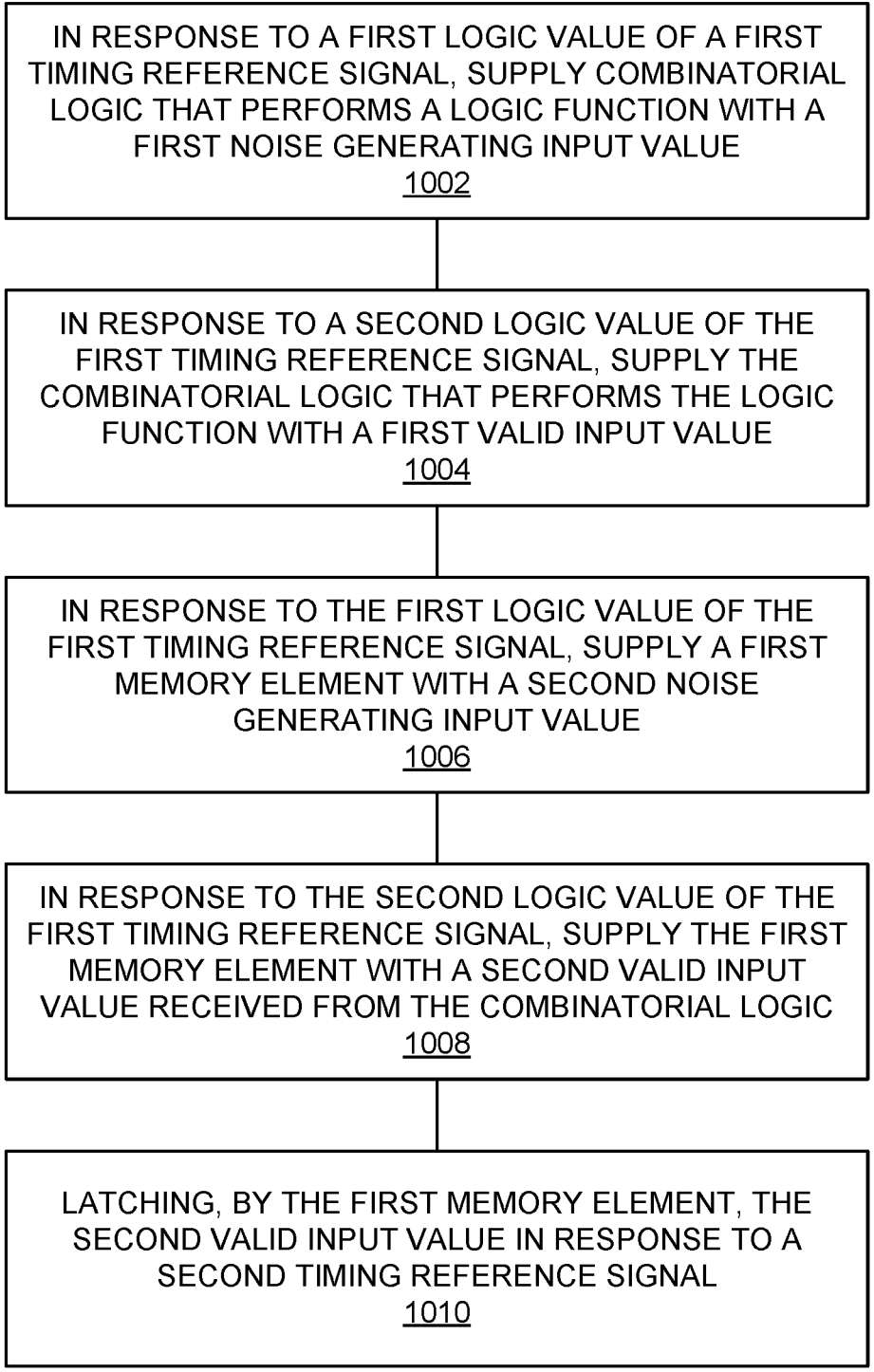
FIG. 10 is a flowchart illustrating the operation of a countermeasure.

FIG. 10 is a flowchart illustrating the operation of a countermeasure. The steps illustrated in FIG. 10 may be performed by one or more elements of countermeasure circuit 100, countermeasure circuit 300, countermeasure topology 400, and/or supply noise generation circuits 916. In response to a first logic value of a first timing reference signal, combinatorial logic that performs a logic function is supplied with a first noise generating input value (1002). For example, logic 120 may be supplied, in response to SELCK having a high logic value, with random input values. These random input values may be supplied to logic 120 by selector 131.

In response to a second logic value of the first timing reference signal, the combinatorial logic that performs the logic function is supplied with a first valid input value (1004). For example, logic 120 may be supplied, in response to SELCK having a low logic value, with valid input values. These valid input values may be supplied to logic 120 by selector 131.

In response to the first logic value of the first timing reference signal, a first memory element is supplied with a second noise generating input value (1006). For example, latch 142 may be supplied, in response to SELCK having a high logic value, with a random input value. This random input value may be supplied to latch 142 by selector 132.

In response to a second logic value of the first timing reference signal, the first memory element is supplied with a second valid input value received from the combinatorial logic (1008). For example, latch 142 may be supplied, in response to SELCK having a low logic value, with a valid input value from logic 120. The valid input value from logic 120 may be supplied to latch 142 by selector 132.

The second valid input value is latched by the first memory element in response to a second timing reference signal (1010). For example, latch 142 may latch a valid input value from logic 120. Latch 142 may latch the valid input value from logic 120 in response to an edge (e.g., rising edge) of the timing reference signal CK.

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of countermeasure circuit 100, countermeasure circuit 300, countermeasure topology 400, latch 800, and/or integrated circuit 910, and their components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 11:
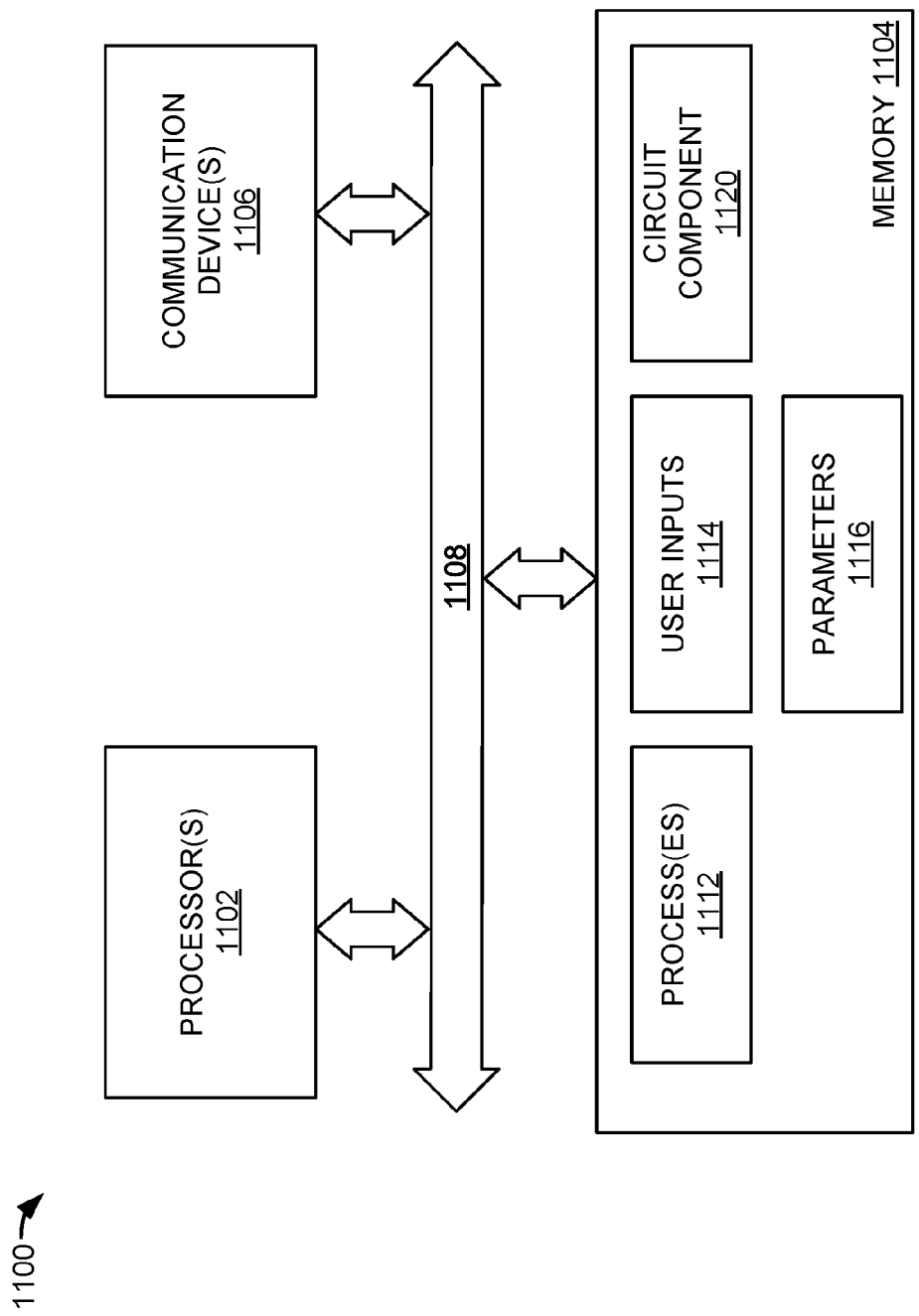
FIG. 11 is a block diagram of a processing system

FIG. 11 is a block diagram illustrating one embodiment of a processing system 1100 for including, processing, or generating, a representation of a circuit component 1120. Processing system 1100 includes one or more processors 1102, a memory 1104, and one or more communications devices 1106. Processors 1102, memory 1104, and communications devices 1106 communicate using any suitable type, number, and/or configuration of wired and/or wireless connections 1108.

Processors 1102 execute instructions of one or more processes 1112 stored in a memory 1104 to process and/or generate circuit component 1120 responsive to user inputs 1114 and parameters 1116. Processes 1112 may be any suitable electronic design automation (EDA) tool or portion thereof used to design, simulate, analyze, and/or verify electronic circuitry and/or generate photomasks for electronic circuitry. Representation 1120 includes data that describes all or portions of countermeasure circuit 100, countermeasure circuit 300, countermeasure topology 400, latch 800, and/or integrated circuit 910, as shown in the Figures.

Representation 1120 may include one or more of behavioral, register transfer, logic component, transistor, and layout geometry-level descriptions. Moreover, representation 1120 may be stored on storage media or communicated by carrier waves.

Data formats in which representation 1120 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email User inputs 1114 may comprise input parameters from a keyboard, mouse, voice recognition interface, microphone and speakers, graphical display, touch screen, or other type of user interface device. This user interface may be distributed among multiple interface devices. Parameters 1116 may include specifications and/or characteristics that are input to help define representation 1120. For example, parameters 1116 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 1104 includes any suitable type, number, and/or configuration of non-transitory computer-readable storage media that stores processes 1112, user inputs 1114, parameters 1016, and circuit component 1020.

Communications devices 1106 include any suitable type, number, and/or configuration of wired and/or wireless devices that transmit information from processing system 1100 to another processing or storage system (not shown) and/or receive information from another processing or storage system (not shown). For example, communications devices 1106 may transmit circuit component 1120 to another system. Communications devices 1106 may receive processes 1112, user inputs 1114, parameters 1116, and/or circuit component 1120 and cause processes 1112, user inputs 1114, parameters 1116, and/or circuit component 1120 to be stored in memory 1104.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A logic circuit for performing at least one logic function, comprising:
   combinatorial logic to perform the at least one logic function, the combinatorial logic having at least a logic input and a logic output;
   a logic input selector to supply, in response to a first timing reference signal, the logic input with noise generating input values and valid input values, the valid input values and the noise generating values to be supplied from the logic input selector to the logic input without at least one of the valid input values and the noise generating values being stored in an intervening register between the logic input selector and the logic input;

a first latch input selector to supply, in response to the first timing reference signal, a first memory element input with noise generating input values and logic output values, the logic output values to be received from the logic output of the combinatorial logic; and, a first memory element having the first memory element input and a first memory element output, the first memory element to latch the logic output values in response to a second timing reference signal.

2. The logic circuit of claim 1, wherein the logic circuit is part of a protected circuit comprising a plurality of the logic circuits and the noise generating input values cause the plurality of the logic circuits to generate random power dissipation noise that provides a countermeasure against at least one of simple power analysis (SPA) and differential power analysis (DPA).

3. The logic circuit of claim 1, further comprising:
a second memory element having a second memory element input and a second memory element output; and,
a second latch input selector to supply, in response to the first timing reference signal, the second memory element input with noise generating input values and logic input values.

4. The logic circuit of claim 3, wherein the second latch input selector alternately supplies noise generating input values and valid input values in response to values of the first timing reference signal.

5. The logic circuit of claim 1, wherein the logic input selector alternately supplies noise generating input values and valid input values in response to values of the first timing reference signal.

6. The logic circuit of claim 1, wherein noise generating input values are supplied by a random number generator circuit.

7. The logic circuit of claim 1, wherein the first timing reference signal is delayed by an interval after the second timing reference signal, wherein the interval is less than one-half a cycle time of the frequency of the second timing reference signal.

8. A method of operating a logic circuit that performs a logic function, comprising:
in response to a first logic value of a first timing reference signal, supplying, by a logic input selector and to a logic input of combinatorial logic that performs the logic function a first noise generating input value, the first noise generating input value not being stored in an intervening register between the logic input selector and the logic input;
in response to a second logic value of the first timing reference signal, supplying the logic input of the combinatorial logic that performs the logic function with a first valid input value;
in response to the first logic value of the first timing reference signal, supplying a first memory element with a second noise generating input value;
in response to the second logic value of the first timing reference signal, supplying the first memory element with a second valid input value received from the combinatorial logic; and,
latching, by the first memory element, the second valid input value in response to a second timing reference signal.

9. The method of claim 8, wherein the logic circuit is part of a protected circuit comprising a plurality of the logic circuits and the first noise generating input value and the second noise generating input value cause the plurality of the logic circuits to generate random power dissipation noise that provides a countermeasure against at least one of simple power analysis (SPA) and differential power analysis (DPA).

10. The method of claim 8, further comprising:
in response to the first logic value of the first timing reference signal, supplying a second memory element with a third noise generating input value, the second memory element outputting the first valid input value.

11. The method of claim 10, wherein the first noise generating input value, the second noise generating input value, and the third noise generating input value represent a same input value.

12. The method of claim 8, further comprising:
receiving the first noise generating value from a random number generator.

13. The method of claim 12, further comprising:
receiving the second noise generating value from the random number generator.

14. The method of claim 8, further comprising:
receiving the first timing reference signal and the second timing reference signal wherein the first timing reference signal is delayed by an interval after the second timing reference signal, and the interval is less than one-half a cycle time of the frequency of the second timing reference signal.

15. A non-transitory computer-readable medium storing a representation of a circuit component comprising:
combinatorial logic to perform the at least one logic function, the combinatorial logic having at least a logic input and a logic output;
a logic input selector to supply, in response to a first timing reference signal, the logic input with noise generating input values and valid input values, the valid input values and the noise generating values to be supplied from the logic input selector to the logic input without at least one of the valid input values and the noise generating values being stored in an intervening register between the logic input selector and the logic input;
a first latch input selector to supply, in response to the first timing reference signal, a first memory element input with noise generating input values and logic output values, the logic output values to be received from the logic output of the combinatorial logic; and,
a first memory element having the first memory element input and a first memory element output, the first memory element to latch the logic output values in response to a second timing reference signal.

16. A computer-readable medium of claim 15, wherein the logic circuit is part of a protected circuit comprising a plurality of the logic circuits and the noise generating input values are to cause the plurality of the logic circuits to generate random power dissipation noise that will provide a countermeasure against at least one of simple power analysis (SPA) and differential power analysis (DPA).

17. The computer-readable medium of claim 15, wherein the circuit component further comprises:
a second memory element having a second memory element input and a second memory element output; and, a second latch input selector to supply, in response to the first timing reference signal, the second memory element input with noise generating input values and logic input values.

18. The computer-readable medium of claim 17, wherein the second latch input selector alternately supplies noise generating input values and valid input values in response to values of the first timing reference signal.

19. The computer-readable medium of claim 15, wherein the logic input selector alternately supplies noise generating input values and valid input values in response to values of the first timing reference signal.

20. The computer-readable medium of claim 15, wherein the circuit component further comprises a random number generator circuit to supply noise generating input values.

* * * * *